United States Patent Office 3,214,373
Patented Oct. 26, 1965

3,214,373
DRILLING FLUID COMPOSITION AND
PROCESS
Carl Adolphson, Bellingham, Wash., assignor to Georgia-Pacific Corporation, Portland, Oreg., a corporation of Georgia
No Drawing. Filed Mar. 7, 1961, Ser. No. 93,853
36 Claims. (Cl. 252—8.5)

This invention relates to the drilling of wells and has particular reference to aqueous drilling fluids for use in drilling oil and gas wells.

A primary object of the present invention is to provide novel drilling fluid compositions and processes for use of the same.

A further object of the present invention is to provide novel drilling mud compositions containing additives prepared from synthetic sulfonated phenolic polymers.

The outstanding properties which most characterize a suitable drilling mud comprise the following: (1) initial gel strength; (2) suitable viscosity; (3) 10-minute gel strength; and (4) water loss, which relates to the sealing off of the wall of the drilling hole by building up a filter cake of mud on the wall, thus preventing loss of water from the mud. Thus, it is manifest that the drilling mud, with its exacting requirements of various properties for the mud is a most important, involved, and complex feature of oil and gas well drilling.

Universally, a drilling mud is used in a circulating system with rotary well drilling mechanism, and is forced by pumping down the hollow drill stem through the bit which it lubricates and cools, then back to the surface to a settling pit. Thus it washes out the cuttings which have been made from the hole, and the cuttings are carried outside the drill stem to the surface where the coarse particles are caused to be removed and the mud again used in a continuous circulating process. To prevent the loss of the mud in porous strata, the mud must be of a character to seal off such strata and the mud, by its hydrostatic pressure, must prevent the escape of gas, that is, prevent the well from blowing out. To provide the proper hydrostatic pressure, the specific gravity of the mud may be increased by adding heavier material than clay such as barytes. On the one hand the drilling fluid must have viscosity, that is, be thick enough to carry out the cuttings, but on the other hand it must be thin enough to be pumped and to allow the coarse particles to settle out so that the mud may be re-used.

In case of temporary stoppage of work, the mud should "gell" sufficiently to prevent settling of the suspended cuttings, which settled cuttings would "seize" the drill stem and prevent re-starting or its withdrawal from the well. From this it is manifest that the viscosity of the fluid is highly important. Likewise, the property to gel or set like gelatin is important when the agitation incident to drilling ceases. Thus, the mud will hold in suspension the cuttings and at the same time become fluid when agitation is resumed. This is called the "thixotropic" property of the fluid, or its gel strength. Most clays have this property, but not all. Such property may be increased by adding the clay called bentonite and similar substances. As the drilling proceeds through different strata, the viscosity and gel strength may be affected by the character of the strata, by the loss by absorption of water or the in-flow of water and other fluids, by temperature changes, or by chemically active sustances which may enter the drilling fluid as the drilling proceeds. Accordingly, viscosity gel and water loss are very carefully watched and corrected from time to time during the drilling.

In the early history of well drilling, water was added to thin the mud, but this had the objectionable result of reducing the specific gravity of the drilling fluid and thereby decreased its ability to suspend the cuttings and the barytes which had been added to give weight. Many additives for thinning drilling muds have been proposed and used.

Salathiel Patent No. 2,681,312 discloses non-cation selective, water soluble sodium salts of sulfonated phenol-formaldehyde condensation products as additives for the control of water loss from drilling muds. The products disclosed in the Salathiel patent are therein shown to be effective as water loss agents, but they are also shown to have no appreciable effect on the viscosity or gel strength of drilling muds to which they are added. Thus, drilling muds containing such products would also require the use of other additives to control these other properties.

A further object of the present invention is, therefore, to provide novel drilling fluid compositions containing synthetic sulfonated phenolic polymers which are effective to control viscosity and gel strength as well as the water loss properties of the fluid.

Other objects and advantages of this invention it is believed will be readily apparent from the following detailed description of preferred embodiments thereof.

Briefly, this invention comprehends within its scope the discovery that novel drilling fluid compositions having unexpected properties are obtained by including in the fluid a thinner or dispersant produced (1) by admixing a water soluble sulfonated phenolic polymer with a water soluble compound containing a metal selected from the group consisting of iron, aluminum, chromium, copper and mixtures thereof, or by reacting a sulfonated phenolic polymer with one or more of said metals in ionic or soluble form to produce a salt of or complex compound containing one or more of said metals; or (2) by oxidizing a water soluble sulfonated phenolic polymer; or (3) by a combination of (1) and (2). Such products are particularly useful as dispersants or thinners for clay-water drilling fluids of all types, i.e., lime base (alkaline earth metal base) muds, fresh water (alkali metal base) muds, gyp muds, salt water muds, emulsion muds and the like.

The sulfonated phenolic polymers used as a starting material in producing thinners useful in the present invention, are prepared, for example, by reacting sulfonated phenolic compounds such as sulfonated phenol, naphthols, cresols and the like with aldehydes such as formaldehyde, acetaldehyde, furfural, mixtures thereof, and the like. Preferred polymers comprise non-cation selective, water soluble sulfonated phenolformaldehyde condensation products prepared by condensing a sulfonated phenolic compound, di-functionally reactive with formaldehyde, with formaldehyde to form a high molecular weight water soluble product which is at least predominantly linearly polymeric. While many different sulfonated mono-cyclic aromatic compounds di-functionally reactive with an aldehyde such as formaldehyde, may conceivably be employed, sulfonated mono-cyclic phenolic materials are preferred.

Because phenol (mono-hydroxy benzene) is readily available and is convenient to handle, I have used phenol in the examples included herein. It will be understood, however, that other suitable phenolic compounds of the class cited above would have been equally applicable. The first step in the preparation of the water soluble salts of sulfonated phenolformaldehyde condensation product from phenol is the sulfonation of the phenol. The sulfonation step is so conducted that the amount of monosulfonated phenol is large while the amount of polysulfonated phenol and unsulfonated phenol is small. As is well known, the sulfonic acid residue in the monosulfonated phenol will be almost entirely in either the ortho or para position, with respect to the hydroxyl group, thus leaving two positions in the phenolic molecule reactive with formaldehyde. To insure that the sulfonated product resulting from the sulfonation of phenol with sulfuric acid is predominantely mono-sulfonated, phenol is reacted with a slight molar excess of sulfuric acid at 100° C. for one-half hour. Under these conditions the mono-sulfonated phenol will consist predominantly of para-sulfonated phenol. However, the conditions under which the phenol is sulfonated are not critical and the aforementioned temperature and reaction time were chosen as convenient conditions for securing a predominantly mono-sulfonated phenol.

On completion of the aforementioned sulfonation step, an aqueous solution of formaldehyde is incorporated in the reaction products of the sulfonation step in order to carry out the condensation between the formaldehyde and the sulfonated phenol. The remaining unreacted sulfuric acid from the sulfonation step acts as the catalyst for the condensation reaction. The temperature at which this condensation reaction is carried out does not appear to affect critically the properties of the resulting product. In the examples included herein, the condensation reaction temperature was arbitrarily chosen to give a conveniently short condensation time while at the same time not giving a reaction rate so rapid as to preclude the stopping of the condensation reaction at the desired stage. Condensation reaction temperatures up to 100° C. may suitably be employed although lower temperatures, for example, 60° C., also result in desirable products so long as the condensation reaction is allowed to proceed for a sufficient length of time.

During the condensation reaction, the reaction mixture becomes increasingly viscous due to the increase in chain length of the sulfonated phenolformaldehyde condensation product. Accordingly, it is necessary to permit the reaction to proceed until the molecular weight of the condensation product becomes sufficiently high, but the reaction must be terminated at the proper time so as to prevent the condensation product from increasing in molecular weight to the point of becoming insoluble in water. When the reaction mixture has attained the proper viscosity (preferably above about 5 centipoises at 26° C. in 7.15% concentration by weight, based on the phenol used), the reaction is terminated. The condensation reaction may be terminated by diluting the reaction mixture with water and quickly neutralizing the diluted mixture with a suitable agent capable of neutralizing any remaining sulfuric acid and of reacting with the sulfonic acid radicals in the condensation product to form non-cation selective, water soluble metal salts of the condensation product. Ammonium hydroxide, an alkali metal hydroxide such as sodium, potassium, or lithium hydroxide, or an alkaline earth metal hydroxide such as calcium hydroxide, or mixtures thereof may conveniently be employed in the neutralization step.

While the sulfonated phenol-formaldehyde condensation product employed in accordance with the present invention and hereinbefore described is predominantly linearly polymeric, it will be understood, of course, that there will be some cross linkage between the predominantly linearly polymeric chain structures. For example, if the sulfonated phenol from the sulfonated step contains some unreacted phenol or some meta-sulfonated phenol, there will be some cross linkage between the predominantly linearly polymeric chain structures because both of the aforementioned phenolic materials have three positions reactive with formaldehyde. Such cross linkages are not objectionable so long as the condensation product is predominantly linearly polymeric. On the other hand, if the sulfonated phenol from the sulfonated step contains di-sulfonated phenol (ortho-para-di-sulfonated or di-ortho di-sulfonated phenol), there will be some phenolic materials present in the condensation reaction mixture which, due to having only one position reactive with formaldehyde, will serve to terminate chain growth by becoming the terminal group on the linear chain. It will be apparent, therefore, that an effort should be made to keep the di-sulfonated phenol content of the sulfonated phenol at a minimum so as to reduce the possibility of vicarious termination of chain length during the condensation step.

The iron, aluminum, chromium or copper-containing synthetic phenolic products of the present invention may be produced in a number of ways. Thus, the synthetic sulfonated phenolic resin or salt may be dried and simply mixed with from 1–50% by weight of a water soluble salt of or complex compound containing the named metal, based upon the weight of the phenolic material; or the synthetic sulfonated phenolic resin or salt may be converted to a salt of or complex compound containing the metal ions iron, aluminum, chromium, copper or mixtures thereof by any desired method such as ion exchange, electrolysis, or by simple base exchange or metathesis.

It is preferred to make the iron, aluminum, chromium or copper salts of synthetic sulfonated phenolic material, and preferably by reacting the latter in aqueous solution with from 1–50% by weight, based upon the weight of the phenolic material solids, of the sulfate salt of one or more of the named metals. Also, where a pure product is desired, it is preferred to use the calcium salt of the synthetic sulfonated phenolic material, so that upon reaction with the iron or other metal sulfate, insoluble calcium sulfate will be produced in a manner permitting ready removal from the solution. In such case, it is preferred to add the metal sulfate in a proportion chemically equivalent to the calcium present, or even in an amount in excess of the amount required or the base exchange.

Oxidation of the synthetic sulfonated phenolic material or salt thereof is carried out in accordance with the present invention by electrolytic oxidation or by means of an oxidizing agent having an oxidizing power stronger than an oxidation potential of about —1.3, such agents including hydrogen peroxide, ozone, lead dioxide, chromic acid, chlorine, alkali and alkaline earth metal hypochlorites, alkali metal chromate (the term "chromate" being intended to include di-chromates) alkali metal permanganate, alkali metal persulfate, alkali metal perborate, and combinations thereof.

The amount of oxidant required depends upon the specific oxidizing agent being used and the nature or condition of the synthetic sulfonated phenolic material being treated. In general, from 1 to 50% of the oxidizing agent, on the basis of the dry solids of the phenolic material can be used. The oxidation is carried out in aqueous solution by the addition of the selected oxidizing agent or by the electrolytic oxidation treatment in a manner well known to those skilled in the art.

Optimum results are obtained by a combination of oxidation and the use of the metal ions iron, aluminum, chromium, copper or mixtures thereof. The order in which the two treatments are carried out is generally immaterial, except in cases where the decomposition of the oxidizing agent is catalyzed by the presence of the metal such as in the case of hydrogen peroxide, the decomposition of which is catalyzed by iron.

EXAMPLE I

This example is to show that improved mud thinning properties are obtained by forming the iron, copper, chromium or aluminum salts of water soluble synthetic sulfonated phenolic resin and that these properties can be further improved by oxidizing said salts. By way of illustration and not limitation improvements obtained in forming the iron salt, the iron salt of a hydrogen peroxide-oxidized and of a sodium dichromate-oxidized water dispersible resin prepared by condensing sulfonated phenol and formaldehyde are set forth in this example.

The salts of the sulfonated phenolformaldehyde resin were prepared as follows: 75 grams of phenol were dissolved in 131 grams of concentrated sulfuric acid and heated 30 minutes at 100° C. The reaction product was cooled to 60° C. and then a solution of 78 grams of 40% formaldehyde in 232 grams of water were added and the mixture heated 46 minutes at 85° C. The reaction mixture was cooled by adding 360 ml. of water, neutralized to pH 6 by adding lime slurry and then to pH 9.8 by adding sodium hydroxide. A portion of the neutralized product was converted to the sodium salt by base exchange using the estimated amount of sodium sulfate equivalent to the calcium present and removing the precipitate of calcium sulfate formed. A second portion was base exchanged to the iron salt in the same manner using ferric sulfate.

The hydrogen peroxide-oxidized iron salt was prepared by adding 8.3 grams of 30% hydrogen peroxide to 125 grams of a solution of the above neutralized product containing 25 grams of solids. The mixture was allowed to stand 24 hours at room temperature and then 25 grams of 25% ferric sulfate solution was added. The mixture was heated 1 hour at 85° C. adjusted to pH 3.0 by adding 10% sodium hydroxide solution, centrifuged to remove calcium sulfate and dried at 60° C. The sulfonated phenolic resin was oxidized before converting to the iron salt because iron, as indicated above, catalyzes the decomposition of hydrogen peroxide. The sodium dichromate-oxidized iron salt was prepared in the same manner, but here the iron salt was prepared first.

The salts were tested for mud thinning in sodium base mud and in gypsum mud (6 pounds $CaSO_4$ per barrel) using a mud having 45.5 lbs. per barrel of a mixture of clays containing six parts by weight of a commercial drilling clay having a "yield value" of 45 barrels of 15 cp. mud per ton of clay and one part by weight of a commercial drilling clay having a "yield value" of 95 barrels of 15 cp. mud per ton of clay.

The mud tests, Table I, show superior mud thinning for the iron salts as compared with the sodium salt and even more effective mud thinning for the oxidized iron salts.

Table I

DRILLING MUD THINNING BY IRON SALTS AND OXIDIZED IRON SALTS OF SULFONATED PHENOL-FORMALDEHYDE

[Hot Rolled Mud Tests Data]

| Sample | Lb./bbl. | pH | IG[1] | PV[2] | Y[3] | 10G[4] | WL[5] |
|---|---|---|---|---|---|---|---|
| *Fresh Water Mud* | | | | | | | |
| Base Mud | | | 9.5 | 31.0 | 8.0 | 51.0 | 147.0 | 13.7 |
| Sodium Salt of Sulfonated Phenol-Formaldehyde. | 0.5 | 9.4 | 18.5 | 14.5 | 30.0 | 54.0 | 12.4 |
| | 2.0 | 9.5 | 7.0 | 12.5 | 20.5 | 48.0 | 12.0 |
| Iron Salt of Sulfonated Phenol-Formaldehyde. | 0.5 | 9.5 | 14.5 | 14.5 | 22.0 | 37.5 | 13.5 |
| | 2.0 | 9.5 | 2.0 | 10.5 | 12.0 | 32.0 | 13.1 |
| 10% Hydrogen Peroxide-Oxidized Iron Salt of Sulfonated Phenol-Formaldehyde. | 0.5 | 9.5 | 3.0 | 13.0 | 11.0 | 29.0 | 13.7 |
| | 2.0 | 9.5 | 1.4 | 10.5 | 5.5 | 19.0 | 11.1 |
| *Gyp Mud* | | | | | | | |
| Base Mud | | | 8.4 | 10.0 | 4.5 | 19.0 | 30.0 | 32.4 |
| 10% Hydrogen Peroxide-Oxidized Iron Salt of Sulfonated Phenol-Formaldehyde. | 6.0 | 8.2 | 1.5 | 6.5 | 6.0 | 10.0 | 12.7 |
| 8% Dichromate-Oxidized Iron Salt of Sulfonated Phenol-Formaldehyde. | 6.0 | 8.2 | 3.5 | 10.0 | 9.0 | 16.5 | 16.5 |

[1] Initial gel. [2] Viscosity. [3] Yield. [4] 10-min. gel. [5] Water Loss.

EXAMPLE II

The purpose of this example is to illustrate that improved mud thinning properties are obtained with varying amounts of formaldehyde relative to the phenol used in preparing the sulfonated phenol-formaldehyde resins. Phenol (75 grams) was heated at 100° C. for a half hour with 131 grams of concentrated sulfuric acid to effect sulfonation. After cooling the sulfonated phenol solution to 60° C. the desired amount of formaldehyde, diluted with water, was added. The resulting solution was heated at 85° C. until thickening of the solution occurred, or in the instance when the smaller amount of formaldehyde was used (when there was no thickening) the heating time was limited to 65 minutes. Immediately upon removing the solution from the heat, it was quenched with cold water and neutralized to a pH of 9 with lime slurry. Portions of the resin solutions were converted to various salts and oxidized salts as in Example I, using the amount of metal sulfate required for base exchange.

Table II

| Sample No. | Wt. Formaldehyde/75 g. Phenol | Salt Prepared | Oxidation Reagent (Percent on T.S.) | Gyp Mud Test, 6 b./bbl. Hot Rolled | | | | |
|---|---|---|---|---|---|---|---|---|
| | | | | IG | PV | Y | 10G | WL |
| 1 | 31 | Sodium | None | 19.0 | 9.0 | 48.0 | 203 | 12.8 |
| 2 | 31 | Iron | do | 5.0 | 9.0 | 11.0 | 18.0 | 19.0 |
| 3 | 31 | do | 14.1% Dichromate | 2.0 | 11.5 | 7.0 | 21.5 | 13.8 |
| 4 | 31 | do | 21.4% Dichromate | 2.0 | 13.5 | 6.0 | 17.0 | 13.8 |
| 5 | 25 | Sodium | None | 27.0 | 6.0 | 43.5 | 73.0 | 11.0 |
| 6 | 25 | Iron | do | 8.0 | 6.5 | 14.5 | 22.0 | 24.3 |
| 7 | 25 | do | 10% $H_2O_2$ | 2.0 | 8.0 | 5.0 | 12.0 | 15.2 |
| 8 | 25 | do | 4% Dichromate | 3.5 | 9.5 | 9.5 | 17.0 | 15.8 |
| 9 | 25 | do | 6% Dichromate | 3.0 | 11.0 | 9.5 | 17.5 | 13.9 |
| 10 | 20 | Sodium | None | 21.5 | 6.0 | 37.0 | 71.0 | 12.2 |
| 11 | 20 | Iron | do | 7.0 | 6.0 | 18.0 | 21.0 | 19.6 |
| 12 | 20 | do | 10% $H_2O_2$ | 1.0 | 7.5 | 6.0 | 14.0 | 10.8 |
| 13 | 20 | do | 4% Dichromate | 7.0 | 10.0 | 14.0 | 18.5 | 12.8 |
| 14 | 20 | do | 6% Dichromate | 2.5 | 9.5 | 8.5 | 13.5 | 12.9 |
| 15 | 15 | Sodium | None | 21.0 | 7.0 | 33.0 | 51.0 | 15.8 |
| 16 | 15 | Iron | do | 14.5 | 7.0 | 23.0 | 31.5 | 21.4 |
| 17 | 15 | do | 10% $H_2O_2$ | 1.0 | 4.5 | 4.5 | 7.0 | 19.0 |
| 18 | 15 | do | 4% Dichromate | 3.5 | 10.0 | 8.5 | 15.0 | 16.7 |
| 19 | 15 | do | 6% Dichromate | 3.0 | 9.0 | 6.5 | 13.5 | 18.2 |
| Base Gyp Mud | | | | 13.0 | 4.0 | 15.5 | 46.5 | 30.1 |

The calcium content of the different preparations ranged from 7.4 to 10.8% calcium, requiring about 30% or more of a 24% solution of ferric sulfate for conversion to the iron salt.

The experimental data and results of gyp mud tests are listed in Table II. It is apparent from the results set forth in Table II that the proportion of formaldehyde may be varied over wide limits. The best products were obtained with 15 or 20 grams of formaldehyde per 75 grams of phenol, somewhat less than the equal molar quantities represented by the tests with 75 grams phenol and 31 grams of formaldehyde. However, effective results are obtained with from 0.5 to 1.5 moles of formaldehyde per mole of sulfonated phenol.

Here again, this example illustrates the marked effectiveness of the iron salt and the increased effectiveness of the oxidized products.

EXAMPLE III

The sulfonated resin was prepared as set forth above, but the amount of resin was scaled up considerably. Concentrated sulfuric acid (260 g.) was added to phenol (150 g.) and after heating for one-half hour at 100° C., formaldehyde (40 g.) as a diluted formalin solution (37% formaldehyde) was added. It was heated further at 85° C. After about 40 minutes the resin began to thicken, and it was immediately quenched with ice water and the pH was adjusted to 9.0 with lime slurry. The product was centrifuged and the calcium sulfate sludge was discarded.

The resin was divided into several equal parts, and each portion was oxidized and base exchanged as shown in Table III. When hydrogen peroxide was the oxidizing agent, the oxidation was done first and was followed by a 16 hour treatment at 90° C., followed by base exchange. The base exchange was done with a solution of the sulfate of the desired metal, in amount equivalent to the calcium in the resin.

The calcium salt of the resin was base exchanged to the sodium salt before oxidation in the one experiment in which oxidation was done with dichromate. After oxidation and base exchange the products were centrifuged, dried at 45–50° C., and tested as gyp mud thinners.

The experimental data and results of gyp mud tests are listed in Table III. The unoxidized sodium salts thickened gyp mud but gave some improvement in water loss. The copper salt produced significant thinning, and oxidation with peroxide improved the copper salt very much, the oxidized coper salt giving remarkably low yield and gel figures.

Table III

CONDITIONS OF RESIN PREPARATION AND RESULTS OF GYP MUD TESTS

| Sample No. | Salt Prepared | Oxidation Reagent (Percent on T.S.) | Gyp Mud Hot Rolled, 6 lb./bbl. | | | | |
|---|---|---|---|---|---|---|---|
| | | | IG | PV | Y | 10 Gel | WL |
| Base Mud | | | 13.0 | 4.0 | 15.5 | 46.5 | 30.0 |
| 1 | Sodium | None | 22.0 | 5.0 | 53.0 | 282.0 | 11.6 |
| 2 | do | 6% Dichromate | 9.0 | 5.5 | 17.5 | 18.0 | 15.7 |
| 3 | Copper | None | 1.0 | 7.0 | 17.0 | 32.0 | 12.5 |
| 4 | do | 10% H₂O₂ | 2.0 | 9.0 | 1.0 | 2.0 | 13.6 |
| 5 | Iron | 10% H₂O₂ | 3.0 | 7.0 | 8.0 | 16.0 | 12.3 |

The amount or concentration of the additives of this invention and discovery which can be added to drilling fluids by way of conditioning these fluids to the desired properties will depend on such factors as the nature of the mud to be treated and the contaminants therein or to be encountered, the characteristics desired in the mud, and the degree of purity of the additive and the specific agents used in preparing and formulating the additive according to this disclosure. For practical purposes, usages of the order of one-quarter of a pound to thirty pounds per barrel are preferred.

Having fully described my invention, it is to be understood that I do not wish to be limited to the details set forth, but my invention is of the full scope of the appended claims.

I claim:

1. A drilling fluid composition comprising an aqueous suspension of a clayey material thinned by a water soluble, synthetic sulfonated phenolic aldehyde condensation product containing from one-fifty percent by weight based on said product of a metal ion selected from the group consisting of iron, aluminum, chromium, copper and mixtures thereof, said sulfonated phenolic aldehyde condensation product being an aldehyde condensation product of a sulfonated phenol selected from the group consisting of naphthols and mono-cyclic phenols.

2. The composition of claim 1 wherein said metal ion is iron.

3. The composition of claim 1 wherein said metal ion is aluminum.

4. The composition of claim 1 wherein said metal ion is copper.

5. The composition of claim 1 wherein said metal ion is chromium.

6. The composition of claim 1 including an excess of calcium sulfate over its solubility in the aqueous medium.

7. The composition of claim 1 wherein the sulfonated phenol-formaldehyde condensation product is prepared by condensing sulfonated phenol and formaldehyde in aqueous solution, and neutralizing the reaction product with lime to form the calcium salt of the sulfonated phenol-formaldehyde condensation product.

8. The process of claim 7 wherein the sulfate salt is present in at least the amount required for base exchange with the calcium.

9. The composition of claim 7 wherein the sulfonated phenol-formaldehyde condensation product is oxidized with an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

10. A drilling fluid composition comprising an aqueous suspension of a clayey material thinned by a water soluble, synthetic sulfonated phenol-formaldehyde condensation product containing from 1–50% by weight based on said product, of a metal ion selected from the group consisting of iron, aluminum, chromium, copper and mixtures thereof.

11. A drilling fluid composition comprising an aqueous suspension of a clayey material thinned by a water soluble, synthetic, oxidized, sulfonated phenolic aldehyde condensation product containing from one-fifty percent weight based on said product of a metal ion selected from the group consisting of iron, aluminum, chromium, copper and mixtures thereof, said sulfonated phenolic aldehyde consenation product being an aldehyde condensation product of a sulfonated phenol selected from the group consisting of naphthols and monocyclic phenols.

12. A drilling fluid composition comprising an aqueous suspension of a clayey material thinned by a water soluble, synthetic, oxdized, sulfonated phenol-formaldehyde condensation product containing from 1–50% by weight, based on said product, of a metal ion selected from the group consisting of iron, aluminum, chromium, copper and mixtures thereof.

13. The composition of claim 12 wherein said metal ion is iron and said product is oxidized with sodium dichromate.

14. The composition of claim 12 wherein said metal ion is iron and said product is oxidized with hydrogen peroxide.

15. The composition of claim 12 wherein said metal is copper and said product is oxidized with hydrogen peroxide.

16. A drilling fluid composition comprising an aqueous suspension of a clayey material thinned by a soluble additive prepared by a process which comprises oxidizing a water soluble, synthetic, sulfonated phenolic aldehyde condensation product with an oxidizing agent having an oxidizing power stronger than an oxidation potential of about —1.3, and admixing said product, in aqueous solution, from one-fifty percent by weight, based on said product, of a metal ion selected from the group consisting of iron, aluminum, chromium, copper and mixtures thereof, said sulfonated phenolic aldheyde condensation product being an aldehyde condensation product of a sulfonated phenol selected from the group consisting of naphthols and monocyclic phenols.

17. A drilling fluid composition comprising an aqueous suspension of a clayey material thinned by a soluble additive prepared by a process which comprises oxidizing a sulfonated phenol-formaldehyde condensation product with an oxidizing agent having an oxidizing power stronger than an oxidation potential of about —1.3, and admixing said product, in aqueous solution, from 1–50% by weight, based on said product, of a metal ion selected from the group consisting of iron, aluminum, chromium, copper and mixtures thereof.

18. The composition of claim 17 wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

19. A method of drilling a well comprising circulating in the well while drilling a well drilling fluid comprising the composition of claim 1.

20. A method of drilling a well comprising circulating in the well while drilling a well drilling fluid comprising the composition of claim 2.

21. A method of drilling a well comprising circulating in the well while drilling a well drilling fluid comprising the composition of claim 3.

22. A method of drilling a well comprising circulating in the well while drilling a well drilling fluid comprising the composition of claim 4.

23. A method of drilling a well comprising circulating in the well while drilling a well drilling fluid comprising the composition of claim 5.

24. A method of drilling a well comprising circulating in the well while drilling a well drilling fluid comprising the composition of claim 6.

25. A method of drilling a well comprising circulating in the well while drilling a well drilling fluid comprising the composition of claim 7.

26. A method of drilling a well comprising circulating in the well while drilling a well drilling fluid comprising the composition of claim 8.

27. A method of drilling a well comprising circulating in the well while drilling a well drilling fluid comprising the composition of claim 9.

28. A method of drilling a well comprising circulating in the well while drilling a well drilling fluid comprising the composition of claim 10.

29. A method of drilling a well comprising circulating in the well while drilling a well drilling fluid comprising the composition of claim 11.

30. A method of drilling a well comprising circulating in the well while drilling a well drilling fluid comprising the composition of claim 12.

31. A method of drilling a well comprising circulating in the well while drilling a well drilling fluid comprising the composition of claim 13.

32. A method of drilling a well comprising circulating in the well while drilling a well drilling fluid comprising the composition of claim 14.

33. A method of drilling a well comprising circulating in the well while drilling a well drilling fluid comprising the composition of claim 15.

34. A method of drilling a well comprising circulating in the well while drilling a well drilling fluid comprising the composition of claim 16.

35. A method of drilling a well comprising circulating in the well while drilling a well drilling fluid comprising the composition of claim 17.

36. A method of drilling a well comprising circulating in the well while drilling a well drilling fluid comprising the composition of claim 18.

References Cited by the Examiner

UNITED STATES PATENTS

| | | | |
|---|---|---|---|
| 2,331,281 | 10/43 | Wayne | 252—8.5 |
| 2,418,528 | 4/47 | Robinson et al. | 260—438 |
| 2,452,021 | 10/48 | Wayne | 252—8.5 |
| 2,605,221 | 7/52 | Hoeppel | 252—8.5 |
| 2,681,312 | 6/54 | Salathiel | 252—8.5 |
| 2,782,241 | 2/57 | Gray et al. | 252—8.5 |
| 2,935,473 | 5/60 | King et al. | 252—8.5 |
| 2,935,504 | 5/60 | King et al. | 252—8.5 |

OTHER REFERENCES

Rogers: Composition and Properties of Oil Well drilling Fluids, revised ed, pub. 1953 by Gulf Pub. Co. of Houston, Texas, pages 322 and 323.

JULIUS GREENWALD, *Primary Examiner*.